May 27, 1947. H. H. THOMPSON 2,421,042
SLAVE DIRECTIONAL GYROSCOPE
Filed Dec. 21, 1942 2 Sheets-Sheet 2
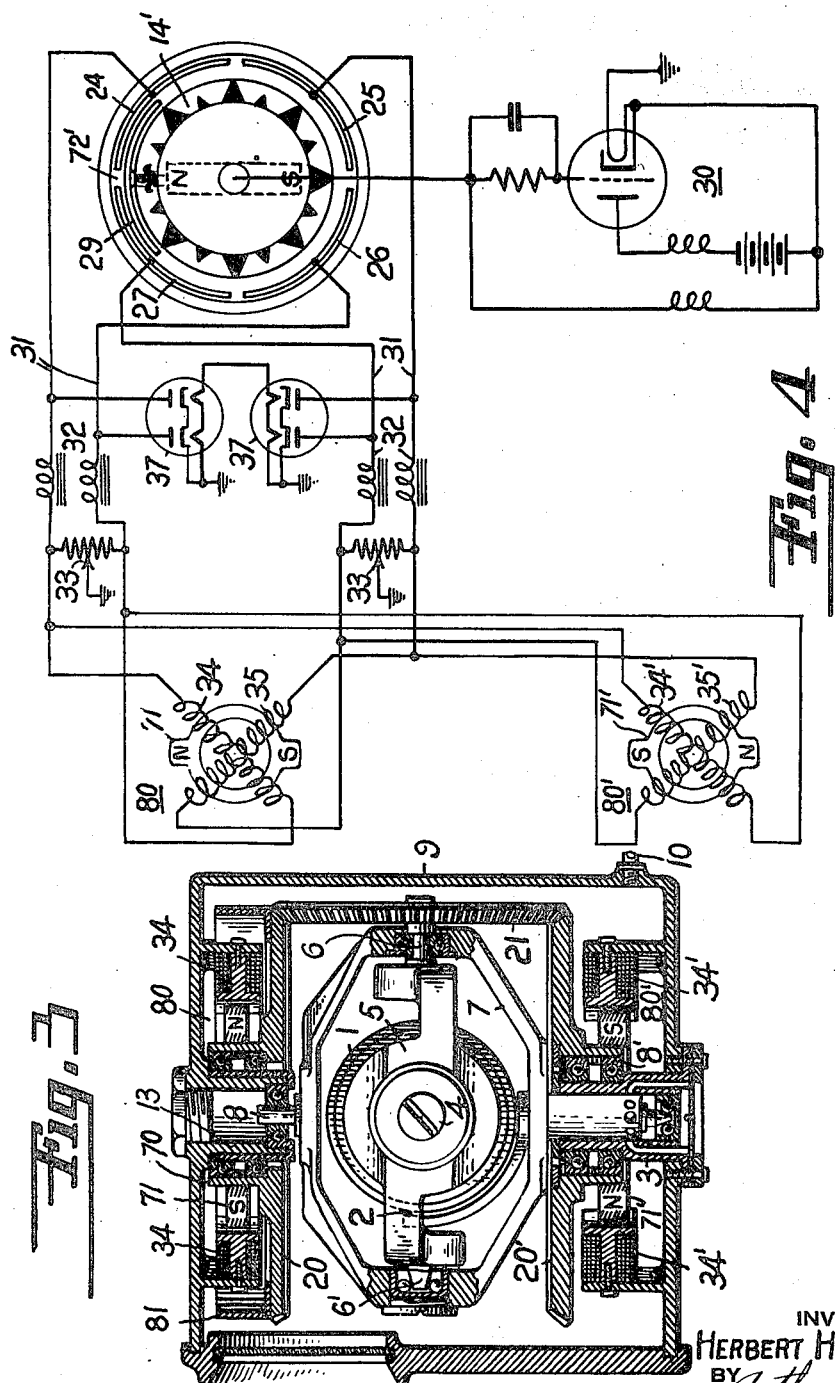
INVENTOR
HERBERT H. THOMPSON
BY Arthur H. Serrell
ATTORNEY Patented May 27, 1947

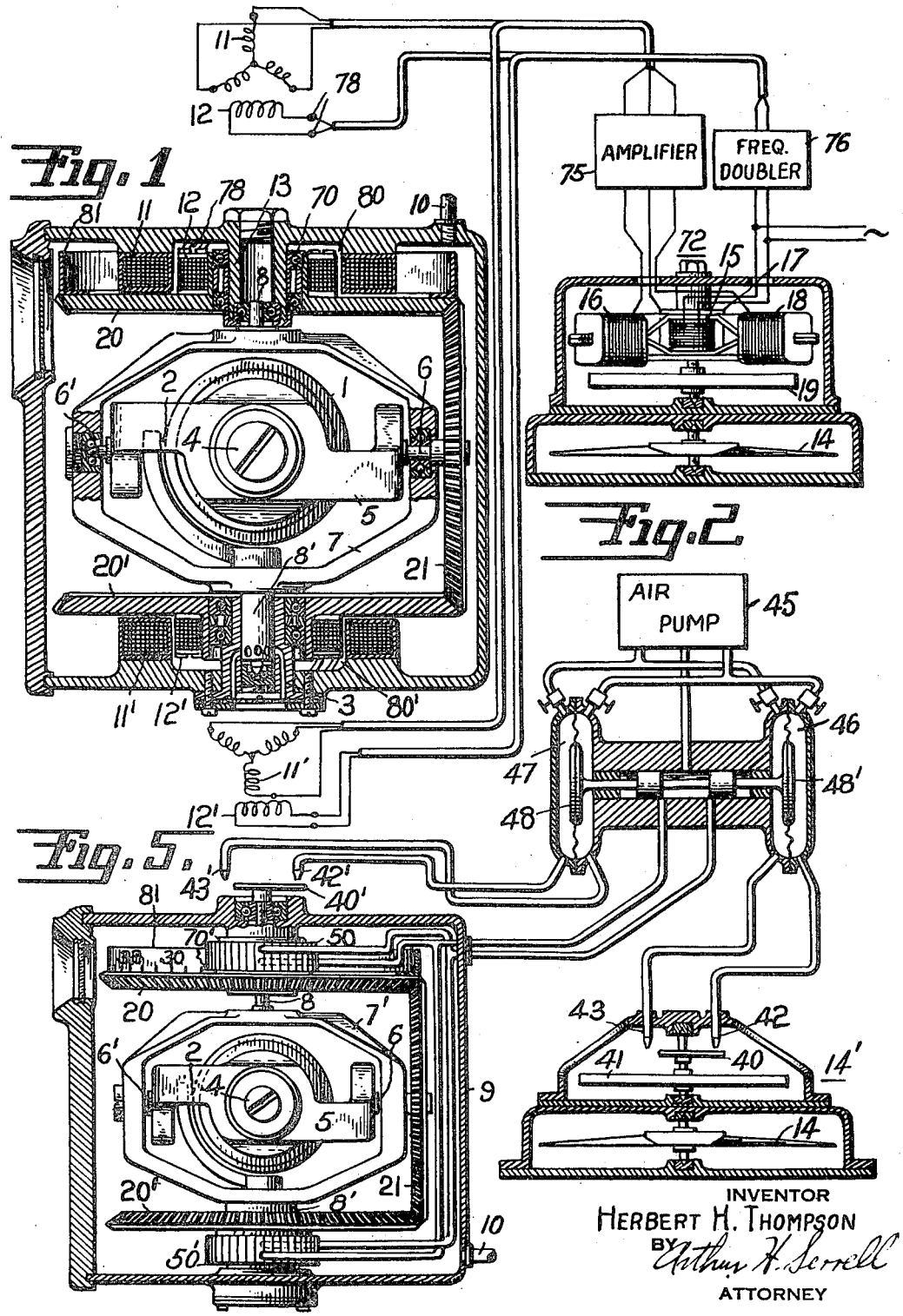

2,421,042

UNITED STATES PATENT OFFICE 2,421,042

SLAVE DIRECTIONAL GYROSCOPE

Herbert H. Thompson, Manhasset, N. Y., assignor to Sperry Gyroscope Company, Inc., a corporation of New York Application December 21, 1942, Serial No. 469,771

11 Claims. (Cl. 33—222)

This invention relates to controlled directional gyroscopes and, more especially, to the art of gyrodynamic control of gyro magnetic compass systems in which an otherwise free or directional gyroscope is remotely controlled from a magnetic compass of some type, having means controlled thereby for applying a torque on the gyroscope upon relative deviation in azimuth of the gyroscope with respect to the magnetic compass. Such systems usually include a means for comparing the positions of the two devices and a separate power source operated therefrom for applying a torque about the horizontal axis of the gyroscope to orient it in azimuth, an example of which system is shown in my prior patent joint with Elmer A. Sperry, No. 2,092,032, dated September 7, 1937, for Gyro-magnetic compasses. That part of physics dealing with the laws of motion of a spinning body under the action of torque about an axis inclined to the spin-axis is called gyrodynamics. (Ferry: Applied Gyrodynamics: Wiley—New York, 1933, p. 45.)

According to the preferred form of my invention, I prefer to eliminate one of such devices and apply the desired torque about the horizontal axis of the gyroscope through the compass position repeating means at the gyroscope. I also avoid, according to my invention, carrying precession coils on the sensitive gyroscope or using slip rings thereon for leading in current to such coils.

My present application is a continuation in part of copending application Serial No. 443,599, filed May 19, 1942, for Slave directional gyroscopes, now abandoned.

Referring to the drawings, showing several forms my invention may assume,

Fig. 1 is a vertical section of a directional gyroscope with special repeater motors, the gyro being shown in side elevation.

Fig. 2 is a vertical section of a magnetic compass housing with a flux gate type of pick-off and repeater circuit elements shown diagrammatically.

Fig. 3 is a side elevation of my slave gyroscope with the outer casing and some other parts shown in section.

Fig. 4 is a view of a magnetic compass and a capacity bridge type of transmitter associated therewith, adapted to actuate the repeating devices, at the top and bottom of my slave gyroscope.

Fig. 5 is a similar view of a still further modification using a differential air flow system for comparing the positions of the magnetic compass and directional gyroscope and applying the precessing torques.

The directional gyroscope proper is shown in Fig. 1 as of the conventional form, comprising a rotor 1 that is spun in any suitable manner, such as by air jets 2 to which air is supplied through a hollow lower bearing 3 in the usual manner. The rotor is mounted for spinning in normally horizontal bearings 4 in the rotor bearing ring 5, which in turn is journaled for freedom about a second horizontal axis 6—6' in the vertical ring 7. The ring 7, in turn, is journaled for turning about a vertical axis 8—8' within the housing 9, from which air may be exhausted through pipe 10 for spinning the rotor. As is well known in the art, the air jets 2 not only spin the rotor, but correct any tilt about axis 6—6' with respect to vertical ring 7. See for example, the patent to Bert G. Carlson, No. 1,982,637, dated December 4, 1934, for Directional gyroscopes.

A compass device 80, capable of exerting an appreciable torque on the gyroscope, is mounted coaxially with the vertical axis 8—8' of the gyroscope. Such device is preferably in the form of a repeater motor shown as mounted immediately above the gyroscope. In Figs. 1 and 2, this motor is shown as of the usual alternating current self-synchronous type in which three-phase winding 11 is shown as fixed on the interior of the housing and a separately excited single-phase winding 12 is shown as mounted on hub 70 rotatably mounted on the exterior of the boss 13 in which the vertical shaft 8 of the ring 7 is journaled. Slip rings 78 are shown to lead in the alternating current to winding 12. Said armature is maintained in position in azimuth from a suitable transmitter 72 on the magnetic compass 14.

In Fig. 3, the motor is of somewhat different form. In this case the armature comprises merely a permanent magnet 71 in which the center portion is made in the form of a ring which surrounds and is secured to the hub 70 rotatably mounted on the boss 13, as before. The field in this case, and as shown in Fig. 4, is composed merely of crossed, low voltage, direct current windings 34, 35 wound on suitable pole pieces. The position of the magnetic armature is therefore determined by the resultant magnetic field produced by the crossed coils 34, 35, so that this armature likewise maintains its position in azimuth from a suitable transmitter 72' on the magnetic compass 14'.

I use the term "magnetic compass" in the broad sense of any means responsive to the position of the horizontal component of the earth's magnetic field, including the flux valve type of compass, which may or may not have a separate magnetic needle. The form of flux valve compass illustrated in Fig. 2 is similar to that shown in the prior application of R. K. Bonell, Serial No. 422,999, filed December 15, 1941, for Magnetic pick-off for sensitive instruments, which became Patent No. 2,373,096, issued April 10, 1945. According to this device, single phase current is supplied to a central winding 15 and an output obtained from the three secondary windings 16, 17 and 18 which is similar to the output of an ordinary self-synchronous transmitter, and which is responsive to the position of the earth's field, the flux from which may or may not be increased by an auxiliary slave magnet 19 positioned above but in close proximity to the magnetic needle 14. The armature 12 therefore will tend to set itself in definite relationship to the earth's field, and a compass card 81 is shown as turned therefrom. If desired, said card may be mounted on the vertical ring 7 of the gyroscope.

Preferably a blocking amplifier 75 is employed between the transmitter and motor so that little or no reactive torque will reach the transmitter. It is also necessary to employ a frequency doubler 76 in this system. In trying to turn toward the meridian, however, armature 12 exerts no torque about the vertical axis of the gyroscope. On the other hand, I have interposed suitable connecting linkage or gearing whereby a torque is applied about the horizontal axis of the gyroscope. Preferably this gearing takes the form of a differential in which the gyroscope becomes the planetary arm. For this purpose I have shown a large bevel gear 20 (on which card 81 is mounted) secured to the armature 12 and meshing with a bevel gear 21 fixed to horizontal trunnion 6 of the ring 5.

Preferably I mount a similar bevel gear 20' and a second repeater motor 11' below the gyroscope. The motor 11' is inverted in sense with respect to repeater motor 11, and is connected to a common power supply and in parallel with the motor 11, all as shown in Fig. 2. The armature 12' of motor 11' is secured to and rotates with gear 20' in the same manner as armature 12 is secured to and rotates with gear 20. Gear 20' is located on the opposite side of the vertical axis of the gyro, and, meshing with gear 21, forms the third arm of the differential. The mutually inverted arrangement of repeater motors 11 and 11' results in their mutual counterrotation when common parallel current supply is provided as the phase sequence of winding 11' of the lower motor is opposite to the phase sequence of the winding 11 of the upper motor, due to their mutual inversion, so that the application of the three-phase voltage of given phase sequence to both motors simultaneously causes them to revolve oppositely.

Normally vertical ring 7 of the gyroscope and repeater motors 11 and 11' occupy positions in which they are angularly aligned with one another. Departure of vertical ring 7 from this normal position carries gear 21 with it. Gear 21, while remaining stationary on its own horizontal axis 6, is thus caused to revolve about the vertical axis of ring 7. This revolution of gear 21 about the vertical axis of ring 7 carries or rotates gears 20 and 21 with it, initially causing them to turn unidirectionally about the same axis, the rotors 12 and 12' of motors 11 and 11' being carried on and with the gears 20 and 20'. Since the rotors of these motors are elements of a Selsyn system, this incipient common angular displacement of the rotors about the vertical axis of the vertical ring 7 disturbs the circuit balance in the stator windings causing currents to flow therein, which, because they are mutually inverted in their mountings, react as if they are wound in reverse phase sequence and produce counter torques in rotors 12 and 12'. This mutual counterrotation of gears 20 and 20' acts unidirectionally on differential gear 21 imposing a torque about axis 6 which causes precession of the gyroscope about its vertical axis and restores the gyroscope to a position of alignment with the magnetic compass. (Vide Ferry, supra). Any deviation between the directional indications of the magnetic compass and the directional gyroscope is thus corrected by the Selsyn system operating through repeater motors 11 and 11' and the differential gear system comprising gears 20, 20' and 21. The torques applied to gear 21 by gears 20 and 20' are at all times equal and opposite, as far as turning effect about the vertical axis of the gyroscope is concerned, so that the application of any unbalanced torque about the vertical axis of the gyroscope is precluded. Any instability which might be caused by tilt of the gyroscope about axis 6, 6' is prevented, in the customary manner, by making the erecting force of jet 2 sufficient to maintain the gyroscope erect.

The form of gyro-magnetic compass shown in Fig. 3, with the wiring diagram illustrated in Fig. 4, operates on the same broad principles, although the repeater system is quite different. In this figure, the system employed is similar to that shown and described in the patent to West, No. 2,277,027, dated March 24, 1942, for Telemetric system, and in the copending application of Carter and West, Serial No. 418,032, for Gyromagnetic compass system, filed November 6, 1941, which became Patent No. 2,363,500, issued November 28, 1944. According to this system, the transmitter comprises a plurality of condenser plates 24, 25, 26 and 27 symmetrically arranged about the magnetic compass 14' and a single plate 29 placed on the compass card, to which high frequency but low voltage alternating current is supplied from a suitable source, indicated generally at 30. The stationary condenser plates together with their lines 31, choke coils 32 and potentiometers 33 constitute two impedance capacity bridges. Connected across each bridge circuit is one coil 34, 35 of a crossed-coil moving-vane meter or repeater motor above described, the armature of which is magnet 71. Preferably, the alternating current in this system is rectified for actuating the repeater motor by means of suitable diode tubes 37, as explained in said above mentioned patent, the ripples being suppressed by chokes 32. It may be noted that in this system no slip rings are necessary, either on the vertical axis of the gyroscope or on the repeater motor. It also possesses all of the advantages of the form shown in Fig. 1. As in Fig. 1, a second similar motor 80' is employed at the base of the gyroscope, which is connected to rotate in the opposite direction to motor 71. To illustrate this, the magnet 71' is shown as having its south pole in the position of the north pole of magnet 71. When the gyro precesses about axis 8, the armatures 71, 71' are rotated therewith. The parallel or shunt-connected stator windings are then energized in accordance with the error signal or departure of the armatures from parallel orientation with the master compass 14'. The flux developed in the stator windings will react on the armatures and tend to restore them to normal orientation along with the attached differential gear 20, 20'. As the armatures are in opposed polar arrangement they will be counterrotated with their gears, and a unidirectional torque will be applied to axis 6 through planetary gear 21 to reorient or restore ring 7 as in Fig. 1.

A still further modification is shown in Fig. 5, in which a differential air flow system is employed instead of the electrical system of Figs. 1, 2, 3 and 4 for comparing the positions of the gyroscope and magnetic compass. In some respects this modification may be considered to be an improvement on the system shown in the prior patent to Sperry and Thompson, No. 2,092,032, dated September 7, 1937, for Gyro-magnetic compasses. According to this system, there is provided at the magnetic compass 14' an eccentrically mounted circular disc 40 which rotates with the magnetic needle 14 or with the slave magnet 41 cooperating with the same. A pair of jet pipes 42, 43 are shown as mounted above said disc, through which air is continuously blown out or sucked in. A similar eccentric disc 40' is mounted at the gyroscope. This disc is preferably on the vertical stem 8 on the vertical ring 7'. Similar jet pipes 42' and 43' are mounted above this disc. An air pump is shown at 45, which is connected by adjustable restricted valves to divided chambers 46, 47. Normally, air is supplied at equal rates on both sides of the central diaphragms or pistons 48 and 48' in each chamber. The jet pipes 42 and 42' operate as differential bleeds from the chambers, so that if one pipe on the gyro (for instance) is uncovered to a greater extent than the corresponding pipe on the compass, the differential pressure will fall in the chamber connected with that pipe, resulting in movement of the relay valve. The same is true of the pipes 43 and 43'. Therefore the system will only be balanced when both of the two discs have the same angular relationship to their jet pipes. In all other positions, the valve will be moved in one direction or the other. Said relay valve is shown as controlling oppositely directed jets on a turbine wheel 50 which may be mounted on the hub 70', and to which is secured bevel gear 20. Similarly, turbine wheel 50' is shown at the bottom of the gyroscope, being reversely driven with respect to turbine wheel 50 by oppositely connected jet pipes and connected to a gear 20', as in Fig. 3. It will readily be apparent, therefore, that upon departure of the gyroscope from its proper relation with the magnetic compass, torque will be applied about the horizontal axis of the gyroscope to cause it to follow the magnetic compass. In this case the gyroscope is also erected by the spinning jets, as well known in the art. (Vide Ferry, supra, pp. 123-125.) When the gyro wanders, the control disc 40' is angularly displaced with reference to disc 40, resulting in an unbalanced pressure acting on pistons 48 and 49' according to the magnitude and sense of the departure. The resulting displacement of valve stem 48, 48' will cause turbines 50, 50' to be counterrotated, according to the direction and amount of piston displacement, which will tend to oppositely rotate gears 20, 20' to apply unidirectional rotative movement to planetary gear 21 about axis 6 causing the return of the gyro to normal orientation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a gyromagnetic compass system, the combination with a directional gyroscope having freedom about vertical and horizontal axes and a magnetic compass for establishing a reference direction, a transmitter controlled by the magnetic compass, repeater motive means at the gyroscope comprising vertical coaxial motive elements mounted on the vertical axis of the gyroscope and secured to planetary gears intermeshed with a third differential gear mounted for rotation on the horizontal axis of the gyro in the vertical ring thereof, said repeater motive means, upon relative displacement of the repeater motive means and said magnetic compass in azimuth, jointly applying a unidirectional torque about the horizontal axis of the gyroscope to cause precession in azimuth eliminating said displacement.

2. In a gyromagnetic compass system, the combination with a directional gyroscope having freedom about vertical and horizontal axes and a magnetic compass, a transmitter controlled by the magnetic compass, two repeater motors at the gyroscope oppositely controlled from said transmitter, and a planetary gear system connecting both motors and said gyroscope in which the gyroscope comprises the planetary arm of the system and the two repeater motors the opposite sides thereof, whereby rotation of the gyroscope in azimuth carries both motors with it, but tilting of the gyroscope in elevation turns said motors in opposite directions.

3. Slaving means for a directional gyroscope, comprising the combination of a rotor bearing frame mounted for freedom about vertical and horizontal axes, means for exerting a precessing torque about said horizontal axis including a first gear means fixed to tilt with the frame, counterrevolving second and third gear means meshing with said first gear means and coaxially arranged with respect to said vertical axis, said three gear means constituting a differential gear, and compass devices normally in angular alignment with said gyroscope for driving said second and third gear means in azimuth upon deviation in azimuth between said compass devices and said gyroscope, whereby a torque is applied about the horizontal axis of the gyroscope and the resultant precession in azimuth restores said gyroscope to a position of alignment with said compass devices.

4. Slaving means for directional gyroscopes, comprising the combination of a rotor bearing frame mounted for freedom about vertical and horizontal axes, means for exerting a precessing torque about said horizontal axis including a first gear means fixed to tilt with the frame, counterrevolving gears cooperating with said first gear and comprising a second and third gear means meshing with said first gear means and coaxially arranged with respect to said vertical axis, all of said gears forming a differential gear system with said gyro and the first gear acting as the planetary arm thereof, and two compass devices oppositely rotated by said second and third gear means, whereby, upon deviation of said gyroscope from a position of alignment with said compass devices, both compass devices are displaced and torques are exerted as a result of such displacement which operate in the same rotational direction about the horizontal axis of the gyroscope but in opposite directions about the vertical axis of the gyroscope thereby to realign the gyroscope and said compass devices.

5. A slave directional gyroscope as claimed in claim 4, in which both of said compass devices comprise mutually inverted electrical repeater motors, one of which tends to return to its original position when displaced and the other to move farther from its original position.

6. In a gyro magnetic compass system, the combination with a directional gyroscope having a rotor bearing frame mounted with freedom about vertical and horizontal axes and a magnetic compass, of a transmitter controlled by the magnetic compass, two repeater motors at the gyroscope oppositely controlled from said transmitter, and a planetary gear system interconnecting said motors and said gyroscope in which the rotor bearing frame of the gyroscope comprises the planetary element of the system and the gears attached to the two repeater motors the opposite elements thereof, whereby said gyroscope is slaved to said magnetic compass in azimuth.

7. In a slaving system for directional gyroscopes, the combination of a rotor bearing frame mounted for freedom about vertical and horizontal axes, means for exerting a precessing torque about said horizontal axis including gear means fixed to tilt with the frame, a second gear means meshing with said first gear means and coaxially arranged with respect to said vertical axis, rotative means affixed to said second gear means, a compass, and means responsive to departure in azimuth between said compass and said gyroscope for actuating said rotative means to turn said second gear means in one direction or the other depending on the direction of the departure between said compass and said gyroscope.

8. A gyro magnetic compass system as claimed in claim 1, wherein said repeater motive means comprises two repeater motors, one above and one below said gyroscope, the stator windings of one motor being connected to said transmitter with opposite phase sequence to the stator windings of the other, whereby said motors exert a torque on said gyroscope only about its horizontal axis.

9. Slaving means for directional gyroscopes, comprising the combination of a rotor bearing frame mounted for freedom about vertical and horizontal axes, means for exerting a precessing torque about said horizontal axis including a first gear means fixed to tilt with the frame, a second gear means meshing with said first gear means and coaxially arranged with respect to said vertical axis, a third gear means also meshing with said first gear means and coaxially arranged with respect to said vertical axis and counterrotatively to the second gear, said three gear means constituting a differential gear, a pair of oppositely acting reversible air turbines affixed to said second and third gear means with common air-jet connections for their mutual counterrotation, a compass, and a pair of differential air flow devices responsive to angular motion in azimuth between said compass and said gyroscope for actuating the control jets of said reversible air turbines to turn said second gear means in one direction and said third gear means in the opposite direction or vice versa depending upon the direction of the angular motion between said compass and said gyroscope.

10. In a direction indicating system of the type including a directional gyroscope pivoted for rotation about vertical and horizontal axes, a reference direction indicating member, and a transmitter responsive to said reference member, in combination therewith, paired, opposed repeater means actuated by said transmitter and interactive with said gyroscope, said paired repeater means and said gyroscope normally being in positions of alignment, and corrective torque transmitting means connecting said repeater means and said gyroscope effective upon differential angular motion between said combined repeater means and said gyroscope for applying a torque about the horizontal axis of said gyroscope to restore said repeater means and said gyroscope to positions of alignment.

11. In a navigating system of the type including a slaved directional gyroscope, a reference direction maintaining member, and a transmitter responsive to relative movement of said reference member, in combination, a pair of rotative repeater means oppositely disposed on and normally aligned with the vertical axis of said gyroscope and responsive to signals from said transmitter, and differential gear means directly interconnecting said repeater means and said gyroscope and operative upon angular motion between these elements to transmit positively from said repeater means to said gyroscope a torque sensed to restore the normal alignment of said gyroscope and said repeater means.

HERBERT H. THOMPSON.

REFERENCES CITED

The following references are of record in the file of this patent:

UNITED STATES PATENTS

| Number | Name | Date |
|---|---|---|
| 2,220,055 | Fischel | Oct. 29, 1940 |
| 2,307,788 | Nisbet et al. | Jan. 12, 1943 |
| 1,988,521 | Sperry et al. | Jan. 22, 1935 |
| 2,092,032 | Sperry et al. | Sept. 7, 1937 |